(No Model.)  3 Sheets—Sheet 1.
J. R. BRIDGES.
KNITTING MACHINE.
No. 300,759.  Patented June 24, 1884.
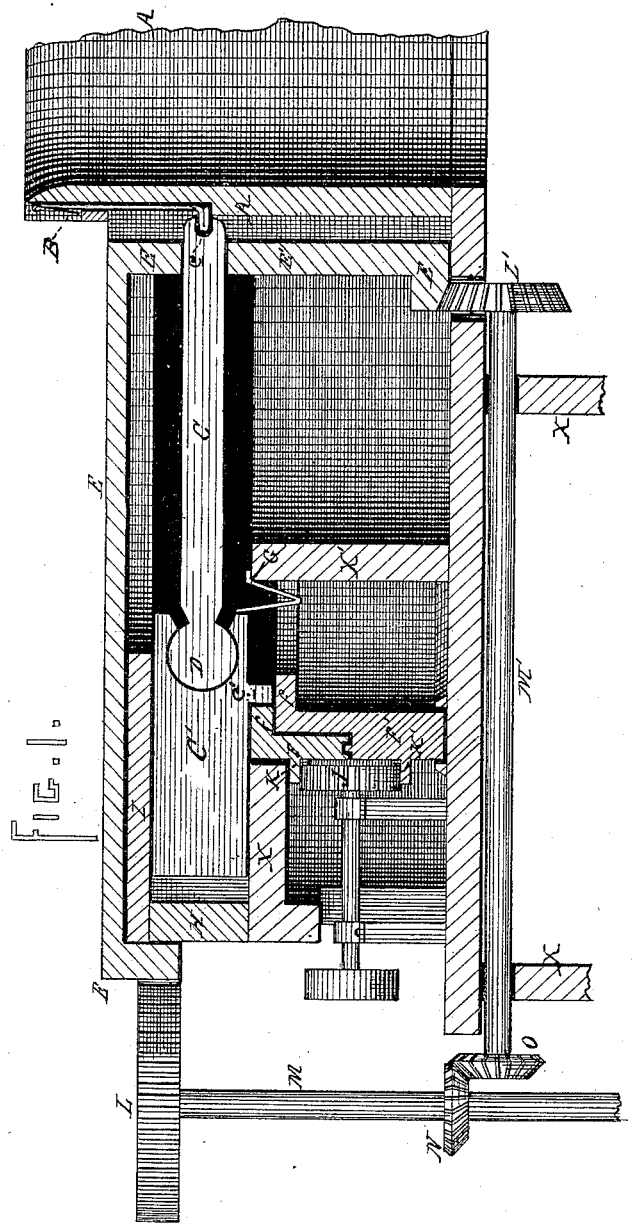
Witnesses
Frankland Jarmus
John J. Halsted
Inventor
John R. Bridges
per Albert E. Gachule
Atty (No Model.) 3 Sheets—Sheet 2.
J. R. BRIDGES.
KNITTING MACHINE.
No. 300,759. Patented June 24, 1884.
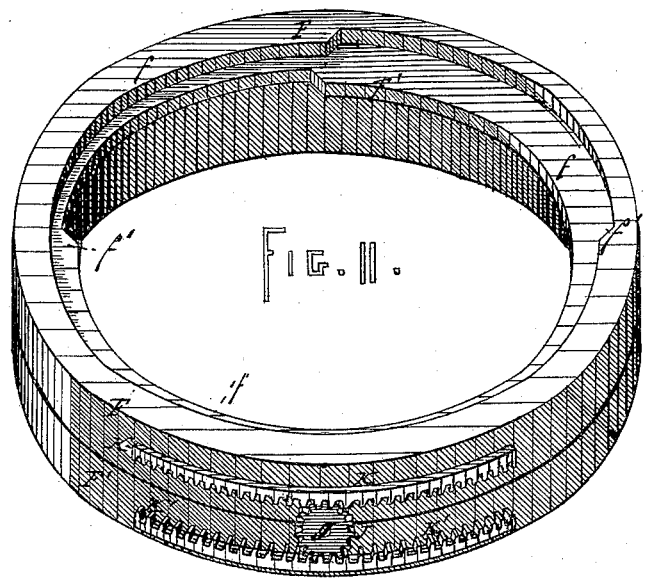
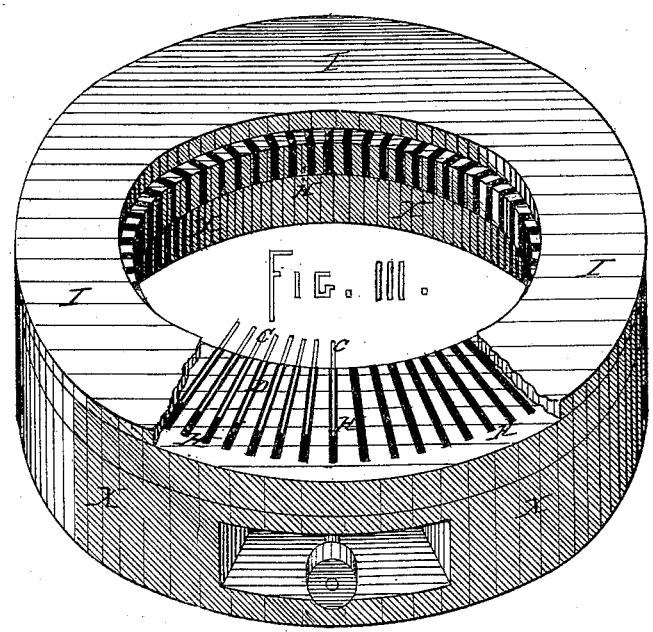
Witnesses
Henry Wadsworth
C. H. Aschbacher
Inventor
John R. Bridges
per Albert E. Zacharie
Atty (No Model.)
J. R. BRIDGES.
KNITTING MACHINE.
No. 300,759. Patented June 24, 1884.
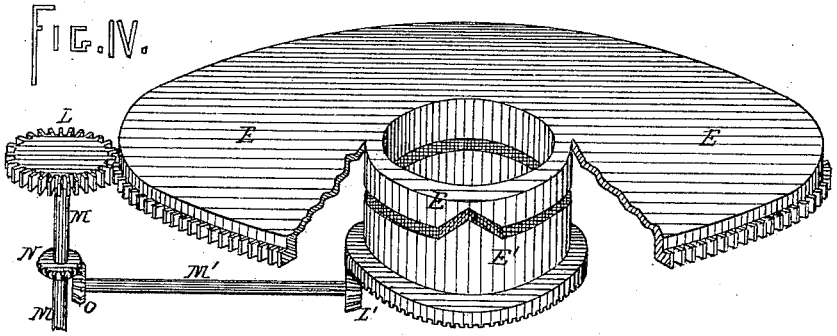
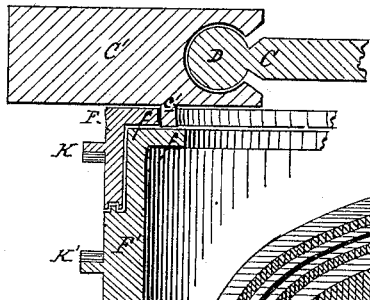
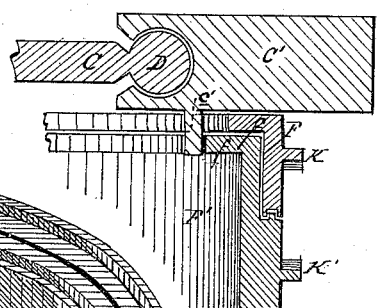
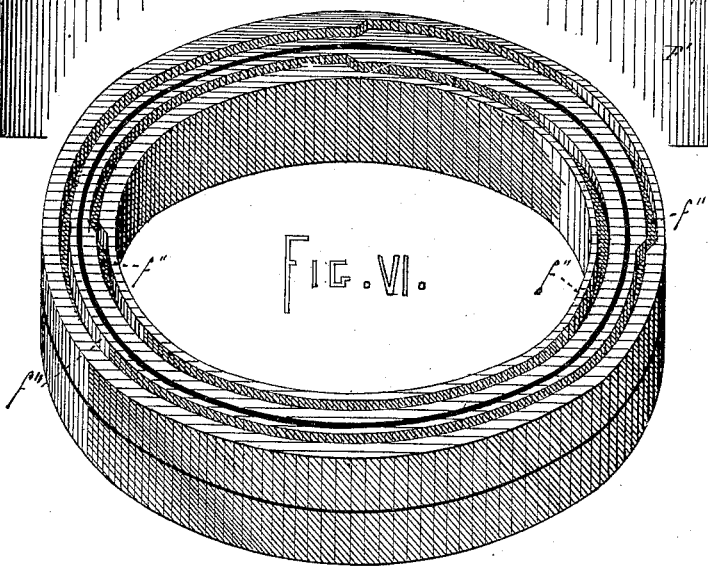
Witnesses
Chas C Mann
A. Mc Laughlan
Inventor
John R. Bridges
per Albert E. Gacherli
Atty

UNITED STATES PATENT OFFICE.

JOHN R. BRIDGES, OF PHILADELPHIA, PENNSYLVANIA.

KNITTING-MACHINE.

SPECIFICATION forming part of Letters Patent No. 300,759, dated June 24, 1884.

Application filed August 18, 1881. (No model.)

*To all whom it may concern:*

Be it known that I, JOHN R. BRIDGES, of the city and county of Philadelphia, State of Pennsylvania, have made certain new and useful Improvements in Knitting-Machines, of which the following is a full, clear, and exact description, reference being had to the accompanying drawings, making part hereof.

My invention consists in the combination of a series of needles, a series of vibratory jacks detachably connected directly with the feet of said needles, respectively; mechanism to vibrate said jacks, and one or more reciprocatory rings constructed and adapted to move said jacks to and from said needles, respectively, whereby the operation of the latter may be controlled, substantially as hereinafter set forth.

Letters Patent of the United States have heretofore been granted me covering a class of devices by means of which the operation of the needles of a knitting-machine may be automatically controlled, said Letters Patent, to which reference may be had, bearing date January 23, 1883, and being numbered 270,928.

My present invention or improvements, while applicable to any form of machine, are especially designed to render the invention covered by said Letters Patent No. 270,928 applicable to machines having a vertical needle-bed, and embrace modifications of the reciprocatory mechanism shown and described in said Letters Patent.

To enable others skilled in the art to construct and operate a machine embodying my said improvements, I will now proceed to describe the same in detail.

In the drawings, Figure I is a sectional view of a portion of a circular-knitting machine having an upright cylindrical needle-bed, showing the application of my improvements. Fig. II is a perspective view of a modification of the reciprocatory rings shown and described in my before-mentioned Letters Patent No. 270,928. Fig. III is a perspective view of the outer and inclosing parts of the machine, showing more particularly the jack-bed or ring. Fig. IV is a perspective view of the cam-faces for vibrating the needle-jacks, showing the arrangement of said cam-faces with respect to each other, and the mechanism to cause them to operate in unison. Fig. V are detached views showing the relation between the reciprocatory rings and the needle-jacks, and Fig. VI is a perspective of a second modification of the aforementioned reciprocating rings.

A is the needle bed or cylinder, provided with the usual slots or grooves, in each of which is set a needle, B, as shown.

My improved jack consists of the parts C C', fixedly hinged or pivoted one to the other at D, Fig. I, the forward portion, C, passing between the cam-faces E E', and the portion C' of the jack being set in one of the grooves or slots of the jack-bed H, Figs. I and III, being preserved in proper position therein by an auxiliary plate, I, which rests upon and is secured to the same, said jack-bed H itself resting upon and being secured to the bed-plate X of the machine, as shown. As before stated, the forward portion, C, of the jack passes and projects between the cam-faces E E', as shown, and is provided with a recess, *c*, by which it (said jack) may be detachably secured to or connected with the foot of the needle B, as shown. The said cam-faces are arranged face to face, Fig. IV, forming a continuous camway or patch through which the portion C of the jack projects, as before stated, and by the revolution of said faces said portion C is given a vibratory movement to accord with the desired movement of the needle. Cam-faces E E' are caused to operate in unison by the proper arrangement and regulation of gears or pinions L L', which in turn are operated by shafts M M', respectively, and bevel-gears N O, said shaft M being actuated by any convenient means.

F F' are a modification of the reciprocatory rings shown and described in my Letters Patent No. 270,928, before referred to, being constructed each with a flange, *f*, and provided with racks G G', respectively. The sliding or reciprocatory portion C' of each jack is provided with a downwardly-extending lug or projection, *c'*, which is caused to impinge or press against the flange *f* of one of said rings F F' by the tension of spring G, one end of which bears against said jack, while the other end is secured to the projecting portion X' of the bed-plate X.

J is a fixed pinion, working in the teeth of racks K K', by the revolution of which pinion first in one direction and then in the other the rings F F′ may be reciprocated. Upon reference to Fig. II it will be noted that said rings, (one of which, F, is mounted upon the shoulder of the other, F′, Fig. I,) as before stated, are each constructed with an inwardly-projecting flange, $f$, that of ring F′ being arranged below or beneath that of ring F, but projecting farther inward or more toward the central line or axis of the machine. It will also be noted that neither of said flanges is uniform in its width, being, on the contrary, partly cut away, or provided with an offset, $f'$, the object or purpose of which construction will presently be explained. It will, of course, be understood that in the machine now being described a series of needles is employed, and for each needle I provide a jointed jack, C C′, constructed as before described, each jack being arranged in a line with the foot of its corresponding needle by the proper relative location of the grooves of the needle-bed A and jack-bed H, the downwardly-extending lug or projection $c$ of the sliding or reciprocatory portion C′ being caused to bear against the flange $f$ of the ring, by which it is to be actuated by its proper location upon the lower edge of said portion C′, and by the proper adjustment in its length.

As shown in Fig. V, the lugs $c'$ of the jacks designed to be actuated by ring F are short and located about the middle of the lower edge of the sliding or reciprocatory portion C′ of the jack, while the lugs or projections of the jacks designed to be operated by the ring F′ are longer, and, located upon the lower edge of the sliding or reciprocatory portion C′ of their respective jacks, move toward the central line or axis of the machine.

It will be evident that according as the edge of the broad portion of flange $f$ or the edge of the offset $f'$ of the rings F F′ are brought to bear against the lugs or projections $c'$ of the several jacks, the latter will be forced inwardly toward the central line of the machine, or be retracted by the tension of their respective springs G, and I so adjust the length of the jacks that when thus forced forward or inward by the broad portion of the flanges $f$, each by the recess $c$ in the forward end of its vibratory portion C, is brought into operative connection with the foot of its corresponding needle, assuming of course that both jack and needle occupy their lowest plane, as shown in Fig. I, and the needles and jacks being thus operatively connected, the former through the vibration of the portions C of the latter by the revolution of the cam-faces E E′, are obviously enabled to perform their function; but when, by a turn of pinion J in the proper direction, the broad portion of either flange $f$ passes the lug or projection $c'$ of a jack by the tension of its spring G, said jack will be retracted until its said lug or projection bears against the edge of the offset $f'$, withdrawing the portion C from operative connection with the foot of its said needle, so that, though the said portion will still project between the cam-faces E E′ and continue to be vibrated by the continuous operation thereof, the needle will remain at rest, or, in other words, be withdrawn from action, and when so withdrawn will obviously occupy its lowest position in the needle-bed; and so, when, by the reverse movement of the rings F F′ by a turn of pinion, J, in the direction opposite to that before imparted to it, the lug of said jack is caused to mount the incline from the edge of the offset to the edge of the broad portion of either flange $f$, such jack will again be forced forward into operative connection with the foot of its corresponding needle and enabled to actuate the same as it is vibrated by the operation of the cam-faces E E′.

It will be evident that by continuing the movement of the rings F F′ in the proper direction to cause the lugs $f$ of a number of jacks to be retracted into the offset $f'$, a number of needles may be withdrawn from action; and while it will further be obvious that needles may thus be brought into and withdrawn from action automatically by the use of a single reciprocating ring, per contra, a greater number than I have shown may be employed to throw needles in and out of action simultaneously at several or various points of the needle-bed.

In Fig. VI, I have shown another modification of the reciprocatory rings. In this the upper edge or surface of each ring is provided with a path or groove, $f''$, in which the lug or projection $c'$ of each jack is set, said lugs in this instance being made of one length, and by the reciprocation of said rings a positive movement to and from the needles will be imparted to said jacks, and the springs G thus dispensed with.

My jacks described may be employed in either straight or round machines, as well also in those having a vertical or an inclined needle-bed, the only requirement being that they—said jacks—be so arranged as to reciprocate in a right line with the feet of their respective needles when the latter occupy their lowest position in the needle-bed, in straight machines the rings F F′ being replaced by corresponding reciprocatory bars, and the actuating cam-faces E E′ likewise modified.

The advantages of machines provided with the improvements described consist in their simplicity and cheapness, as also in the fact that, as before stated, the needles, when withdrawn from action, occupy their lowest position in the needle-bed.

The jointed jack described may be employed in machines having either form of reciprocatory rings shown and described; but when the ring shown in Fig. VI is employed, the jack obviously may be made of a single rigid piece, the lug or projection $c'$ being made knuckle-shaped and set in the groove $f''$ of said ring, and while thereby reciprocated or moved to and from the needle being free to be vibrated by the cam-faces E E'. I greatly prefer, however, to use the jointed jack.

Having thus described my invention, what I claim as new, and desire to secure by Letters Patent, is—

The combination of a series of needles, B, a series of vibratory jacks, C C', detachably connected directly with the feet of said needles, respectively, cam-faces E E', and mechanism to actuate them in unison, and one or more reciprocatory rings, F, constructed and adapted to move the jacks to and from their respective needles, substantially as shown and described.

JNO. R. BRIDGES.

Witnesses:
W. B. DALTON,
ALBERT E. ZACHALE.